2,938,823

TREATMENT OF POLYETHYLENE TEREPHTHALATE FIBERS

Samuel Salem, Akron, and Robert E. Bingham, Cuyahoga Falls, Ohio, assignors to The General Tire & Rubber Company, Akron, Ohio, a corporation of Ohio No Drawing. Filed Nov. 28, 1956, Ser. No. 624,751

7 Claims. (Cl. 154—139)

The present invention relates to a process of treating yarn, cord and fabric made from polyethylene terephthalate fibers for incorporation in reinforced rubber articles.

Nylon and polyethylene terephthalate are very similar in chemical structure and physical characteristics. Both are high strength, linearly oriented synthetic fibers and are adapted for the same end uses, for instance, as the reinforcement in reinforced rubber articles. The technique of processing nylon to incorporate it in reinforced rubber articles, such as V belts, pneumatic tires and the like, is more or less understood. According to the recognized technique, the nylon is first immersed in an adhesive dip and then dried and hot stretched in an oven at relatively high temperatures. When polyethylene terephthalate is substituted for nylon and is dipped and hot stretched in the same manner, however, the results are unsatisfactory. The polyethylene terephthalate fibers deteriorate, particularly when subjected to repeated flexing in rubber, and are difficult to adhere to the rubber.

The object of the present invention is to provide a process for treating polyethylene terephthalate fibers so that they can successfully be used as the reinforcing material in reinforced rubber articles such as pneumatic tires.

In accordance with the present invention, we have found that when polyethylene terephthalate fibers are dipped in and adhesive solution or dispersion, and then dried and heat set without elongation in an oven at relatively high temperatures for relatively short periods of time, they are in no way deteriorated and long lasting, reinforced rubber articles can be manufactured. Polyethylene terephthalate can thus be utilized in reinforced rubber articles to provide tires, V belts and other products having the same outstanding properties as nylon reinforced rubber articles. In some instances, the polyethylene terephthalate reinforced rubber articles have even better properties than the nylon reinforced articles.

More particularly, we have found that when Dacron is dipped into an adhesive such as a solution of rubber containing polyisocyanate and the thus dipped Dacron material is dried and heated at a suitably elevated temperature above 250° F. and less than 425° F. for a sufficient time without appreciably permanently elongating it, one cannot only obtain strong adhesion to rubber but one will retain the original properties in the Dacron cord or fabric. The temperature and time relationship is extremely important for satisfactory adhesion and the Dacron fibers cannot be stretched to permanently elongate the material without causing deterioration. The permanent elongation of the Dacron fibers while they are heated at the elevated temperature apparently does not affect the adhesion of rubber to the Dacron but does materially deteriorate the properties of the Dacron cord or fabric, particularly fatigue resistance. Dacron is the trademark of E. I. duPont de Nemours & Company of Wilmington, Delaware, for fibers made by extruding and orienting high molecular weight esters of ethylene glycol and terephthalic acid, otherwise referred to herein as polyethylene terephthalate fibers.

After thorough immersion and saturation in the dip solution, the fabric is heated in an oven at from 250 or, preferably 350, up to 450° F. for from 40 seconds or a minute when the temperature is around 400 to 450° F. up to 10 minutes or more when the temperature is around 250° F. At the same time that the fabric is being dried, it is preferably being stretched but only sufficiently to keep it from shrinking when tension is removed. It is sort of heat setting. Any permanent elongation, we have found, materially reduces the fatigue resistance of the Dacron cords or fabric, the greater the amount of stretch the greater is the loss in fatigue resistance. The magnitude of stretch possible without permanently reducing fatigue in material amount varies with the degree of twist in the cord and is higher in the case of cords with higher twists as would be expected but generally should not exceed ½ or ¾ of one percent, although in some cases elongations of up to 5 or 6 percent can be tolerated. After the heat treatment, the fabric is cooled as is customary in treating nylon fabrics. The fabric has to be maintained under tension as it is cooled to prevent shrinkage, the tension being gradually released as the temperature goes from the oven temperature down toward room temperature. Generally the tension can be released at around 150° F. We have found that the tension per cord has to be around five pounds at the oven temperature and can be reduced as the temperature is lowered.

The time and temperature reached in the cords or at which the fabric is dried in a given oven are the principal variables. In an isocyanate-rubber adhesive composition isocyanate concentration is also a variable of importance. With a given isocyanate concentration the same degree of reaction and the same results may be had by heating the treated cord a longer time at a lower temperature within the range of 250° F. to 450° F. oven temperature as is had by heating a shorter time at a higher temperature. The preferable temperature range is 350° F. to 425° F. at times of 1 to 3½ or 4 minutes. The lower temperature range is less desirable because it requires appreciably longer times. The reaction apparently approximately follows the law of chemical reactions, the reaction speed almost approximately doubling for each 10° C. of elevated temperature. The optimum time at 300° F. in the cord fabric is about 15 to 18 minutes. The optimum time at 400° F. (in the cord) is therefore much less than 1 minute or about .4 or .5 minutes and at 375° F. in about 1 minute and 350° F. about 2 minutes etc. About optimum results are obtained when the time $t$ (in minutes) at a given cord temperature T (in degrees F.) is given by the formula $$t = \frac{64}{2^p} \text{ where } p = \frac{(T-254)}{18}$$

Reasonably good results are obtained when the time in the oven at a given temperature is ½ to $3t$ as determined by the above formula. Of course, the temperature in the cord or fabric is not immediately the temperature of the oven atmosphere. When the temperature is maintained in the cords, particularly temperatures of 375° F. or more, for longer times than the optimum, the maximum adhesion obtainable falls off. Oven time treatments at the higher temperatures are much more severe than at the lower temperature as would be expected.

The rate of heat transfer to the cord and the factors affecting it must be considered. The hot air velocity, rubber solids concentration, and thickness of the cement film are all factors. An increase in the hot air velocity increases the rate of heat transfer. An increase in the rubber solids concentration, and thickness of cement film decreases the rate of heat transfer.

When oven temperatures of 350–450° F. are used, the exposure of the cords in the oven should be such that the cords themselves do not reach a temperature greater than 410° F. At such higher temperatures the reaction proceeds so rapidly that it passes the point of optimum adhesion before it can be stopped so that a cord temperature below 410° F. is preferable. In addition, cord temperatures over 410° F. approach the softening point of Dacron and are thus not desirable.

When the cord is first introduced into the oven, there is a lag between the temperature in the cord and the temperature in the oven. Generally at least ½ minute is required at 400° F. with good gas velocity for cords to reach oven temperature. Somewhat longer is required at lower temperatures such as 300° F. For this reason and particularly at higher temperatures, at least ½ minute should be added to the value of time $t$ obtained from the above formula in order to obtain the optimum drying time.

Suitable rubbers for use in the adhesive dip are natural rubber, rubbery polymers of conjugated diolefinic compounds such as butadiene isoprene, dimethyl butadiene and chloroprene including copolymers of such compounds with a mono-olefine. Examples of such copolymers are butadiene-styrene copolymers, such as GRS, butadiene-acrylonitrile copolymers and other similar rubbery copolymers and copolymer mixtures. Hydrocarbon rubbers and particularly natural (Heavea) rubber is preferred for the purposes of my invention.

Suitable solvents are any of the known anhydrous organic solvents for the particular rubber used such as petroleum naphtha, carbon tetrachloride, and benzene in the case of hydrocarbon rubbers and methyl ethyl ketone and the like for non-hydrocarbons soluble therein.

The polyisocyanate should preferably have at least two highly reactive isocyanate groups which will readily react with hydroxyl groups. When the polyisocyanate has one group of high reactivity and another stearically hindered or inhibited to have relatively lower reactivity as in the case of 2,4 toluene diisocyanate, the degree of adhesion is inferior to that obtainable when at least two isocyanate groups are attached to aromatic carbon atoms which are adjacent carbons which are free of substituents.

Examples of suitable organic polyisocyanates for use with this invention are MDI (methylene bis 4-phenyl isocyanate), naphthalene di and tri isocyanates and p,p',p" triphenyl methane triisocyanate. Aryl or aryl-alkyl polyisocyanate are preferred because aliphatic polyisocyanates tend to be more toxic and thus more difficult to work with. Organic polyisothiocyanates can also be used with this invention in place of or together with organic polyisocyanates.

In preparing the adhesive solution the rubber is preferably dissolved in the anhydrous solvent and the ½% or ¾% up to 14 percent by weight of organic polyisocyanate is thereupon added to the dip. The amount of the particular polyisocyanate added depends upon the number and effectiveness of the isocyanate groups in the isocyanate on a weight-for-weight basis. The triisocyanates are more effective on a molecular basis than diisocyanates. From 5 to 14 percent by weight of diisocyanates are preferably added to the dip and from 2 to 9 percent of triisocyanates are preferably added to the dip. The dip is preferably maintained at room temperature under anhydrous conditions. The solvent for the rubber is generally selected to minimize evaporation into the ambient atmosphere.

As the concentration of isocyanate is increased with a constant drying temperature, the drying time may be decreased. As the drying temperature is increased with a constant concentration of isocyanate, the drying time may be decreased still obtaining the same degree of adhesion. As the drying temperature is increased with a constant drying time, the isocyanate concentration may be decreased for a given adhesion below the optimum value.

On the completion of the drying and tensioning operation, the fabric material is placed in the rubber body and the rubber of the composite article vulcanized under heat and pressure in contact with the heated cord or fabric.

It should be noted that in accordance with the present invention the cord can be dipped in an adhesive such as a rubber cement containing an organic isocyanate dried at room temperature, and then heat-set or dipped and then dried and heat set in the same operation. The latter is of course the preferable procedure because it eliminates a separate drying step and does not incur an additional storage problem.

When my process is used, I have been able to obtain consistent adhesions from 18 to 23 lbs. per cord as tested in the Standard H single cord adhesion test. To the best of my knowledge, the most satisfactory adhesion obtained by previous methods, including isocyanate treatments, was not over 12 pounds. For general use in tires, V belts and the like, the adhesion should be around 16 pounds or more.

The improvement is even more pronounced with respect to dynamic adhesion or flex resistance. Composite rubber-Dacron articles made in accordance with the present invention, such as pneumatic tire carcasses, resist repeated flexing and usage much longer than the same articles made with Dacron cords coated with the identical dip but subjected to other synthetic cord treating process such as the hot stretch nylon treating process.

EXAMPLE I

A rubber cement was made up by milling 35 parts of channel black, 3.3 parts sulfur and .8 part accelerator into 100 parts of natural rubber sheet. This was in turn dissolved in rubber maker's gasoline under constant agitation. The cement was diluted until it contained 10 percent total rubber solids. To 100 grams of the above-prepared rubber cement was added 5 grams of MDI. Since MDI is insoluble in gasoline, the dip solution had to be agitated for about ten minutes before it was ready for use.

Dacron cords were dipped in the resultant solution and then dried for ten minutes in an oven at from 150 to 300° F. The cords were then placed in H adhesion molds using standard V-6 rubber stock and were cured for 25 minutes at 287° F. The adhesion in pounds between the cords and cement was determined using the Standard H adhesion test.

The resultant adhesion for various oven drying temperatures is tabulated below in Table I. Six cords were dried and tested for each oven temperature and the adhesion given is the average adhesion of the six cords.

*Table I*

| Standard H adhesion (in pounds): | Oven Temperature (in ° F.) |
| --- | --- |
| 11.2 | 150 |
| 12.6 | 200 |
| 16.7 | 250 |
| 23.5 | 300 |

EXAMPLE II

A natural rubber cement with rubber maker's gasoline as the solvent was made up as in Example I to contain 6 percent total rubber solids.

To 100 grams of the above-described cement was added 5 grams of MDI. Before being used, the resultant dip solution was agitated for about ten minutes.

Dacron cords were dipped in the resultant solution and dried for one minute in an oven at from 250° F. to 410° F. The adhesion in pounds between the cords and cement for various oven temperatures was determined as in Example I and is tabulated in Table II below:

Table II

| Standard H adhesion (in pounds): | Oven temperature (in °F.) |
|---|---|
| 12.0 | 250 |
| 14.8 | 300 |
| 18.2 | 350 |
| 21.1 | 365 |
| 23.2 | 375 |
| 17.2 | 400 |
| 13.5 | 410 |
| 10.0 | 425 |

It is to be understood that in accordance with the patent statutes, various modifications of my process can be made without departing from the scope of the invention.

This application is a continuation-in-part of our application Serial No. 394,045, filed November 24, 1953 and now abandoned.

What we claim is:

1. A method of making a composite product comprising a body of vulcanizable rubbery compound and reinforcing fabric material having fibers of a linear, oriented ester of terephthalic acid and a glycol comprising the steps of coating said reinforcing fabric material with an adhesive dip solution of at least 3 percent solids of a rubbery compound and at least ¾ percent of an organic polyisocyanate, drying and heat setting the coated material at from 250° F. to 410° F. for at least 40 seconds and not more than 10 minutes while stretching of the coated material is held to less than ¾%, associating said coated and dried fabric material with the body of vulcanizable rubbery compound, and then heating the composite articles to effect vulcanization of said rubbery compound and to adhere said fabric material to said rubbery compound.

2. A process of treating fiber material comprising a linear, high-molecular weight ester of terephthalic acid and a glycol to adhere it to rubber comprising the steps of dipping the fiber material in an adhesive dip bath comprising a solution of rubber in a solvent containing from 3 to 12 percent rubber solids and from ¾ to 14 percent of a compound selected from the group consisting of organic polyisocyanates and organic polyisothiocyanates and then without permanently elongating it more than ¾%, drying the fiber material at from 250 to 410° F. for at least 1 minute and not more than 10 minutes.

3. The process of claim 2 in which the rubber in the solvent is natural rubber.

4. The process of claim 2 in which the fiber material is dried for a period of time given by the formula:

$$t = \frac{64}{2^p}$$

in which $$p = \frac{(T-254)}{18}$$

where $t$ is the optimum time, where T is the temperature in degrees F. and where the period of time for which the fiber material is dried may be from ½$t$ to 3$t$.

5. A process of treating polyethylene terephthalate fibers coated with an adhesive prior to incorporating them in reinforced rubber articles comprising the steps of subjecting the fibers to oven temperatures of from 250° F. to 450° F. for at least 40 seconds and not more than 10 minutes while applying sufficient tension to prevent shrinkage but not enough to elongate the fibers, cooling the fibers while maintaining tension, and, when the fibers have cooled, releasing tension, tension being controlled so that fiber elongation does not exceed ¾%.

6. A process of treating polyethylene terephthalate fibers coated with an adhesive prior to incorporating them in reinforced rubber articles comprising the steps of subjecting the fibers to oven temperatures of from 350° F. to 425° F. for from 1 to 4 minutes while applying sufficient tension to prevent shrinkage but not enough to elongate the fibers, cooling the fibers while maintaining tension, and, when the fibers have cooled, releasing tension, tension being controlled so that fiber elongation does not exceed ¾%.

7. A reinforced rubber article containing polyethylene terephthalate fibers treated in accordance with the process of claim 5.

References Cited in the file of this patent

UNITED STATES PATENTS

| 2,415,839 | Neal et al. | Feb. 18, 1947 |
| 2,419,922 | Tippetts | Apr. 29, 1947 |
| 2,590,586 | Thompson et al. | Mar. 25, 1952 |
| 2,657,162 | Tibenham | Oct. 27, 1953 |
| 2,679,088 | Meherg et al. | May 25, 1954 |
| 2,709,148 | Jacque | May 24, 1955 |
| 2,758,908 | Kolb | Aug. 14, 1956 |
| 2,768,057 | Friederich | Oct. 23, 1956 |
| 2,768,868 | Hewett et al. | Oct. 30, 1956 |
| 2,783,176 | Boicy | Feb. 26, 1957 |

FOREIGN PATENTS

| 118,839 | Australia | Aug. 31, 1944 |